Figure 1:
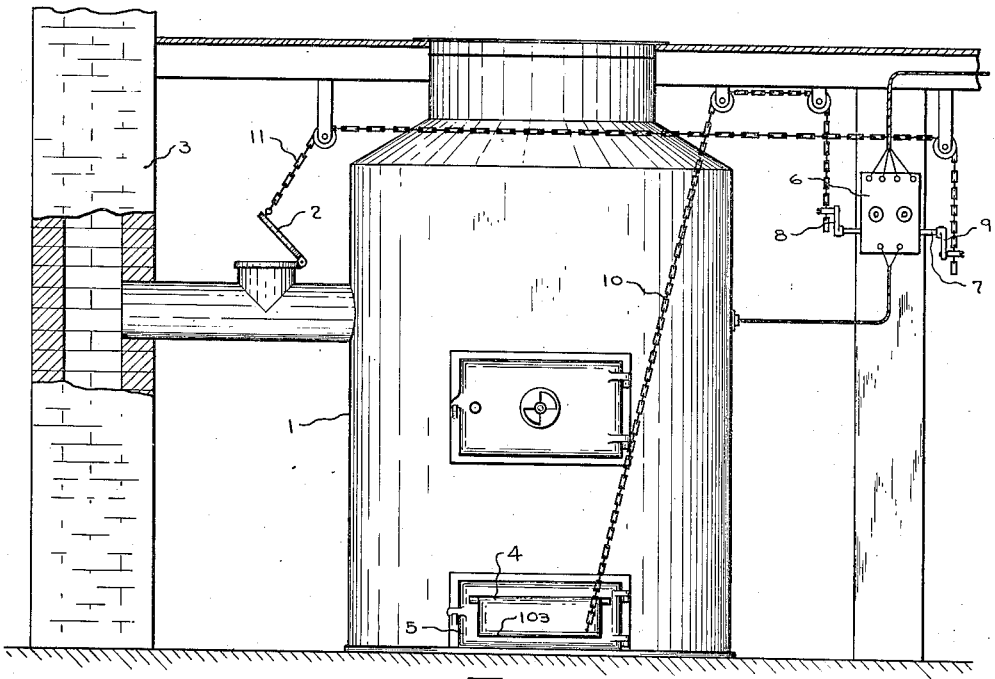

July 18, 1939. M. R. DOOLITTLE 2,166,242
METHOD AND APPARATUS FOR THE CONTROL OF TEMPERATURE
Filed Sept. 1, 1936    2 Sheets-Sheet 1

Inventor
MERVIN R. DOOLITTLE

By Beaman & Langford
Attorney

July 18, 1939.  M. R. DOOLITTLE  2,166,242
METHOD AND APPARATUS FOR THE CONTROL OF TEMPERATURE
Filed Sept. 1, 1936  2 Sheets-Sheet 2

Inventor
MERVIN R. DOOLITTLE
By Beaman & Langford
Attorney

Patented July 18, 1939

2,166,242

UNITED STATES PATENT OFFICE 2,166,242

METHOD AND APPARATUS FOR THE CONTROL OF TEMPERATURE

Mervin R. Doolittle, Jackson, Mich.

Application September 1, 1936, Serial No. 98,962

15 Claims. (Cl. 236—74)

This invention relates to a method and apparatus for the automatic control of temperature and more particularly to apparatus responsive to temperature variations at a selected point to control that temperature by anticipating the temperature variations.

In changing the temperature of a mass or space by the transfer of heat from a heat producing means to the mass or space to be heated or conversely, by the transfer of heat to a cold producing means from a mass or space to be refrigerated, if the source of energy to either of these temperature changing means be discontinued, there will be what may be termed a heat momentum in the direction of the change. The extent to which this action maintains varies as the difference between both the masses of and the temperatures of the temperature changing means and the mass or space whose temperature is being changed. For example the temperature in a room heated by a furnace changes much more slowly than the temperature of the furnace and when the combustion in the furnace is stopped or retarded the furnace, being of appreciable mass compared with the air in the room and being at a considerably higher temperature than the room, will continue to deliver heat to the room after the combustion has been stopped or retarded.

In the usual form of thermostatic temperature control, the source of energy to a heat producing means is not stopped until the temperature at the selected point has reached the value beyond which further rise is not desired. Due to the heat momentum mentioned above a further rise is inevitable. Also the source of energy is not restored when the temperature falls to the same value at which it was stopped, nor is it restored until the temperature falls to a somewhat lower value, with the result that even greater heat momentum results than would result if this additional temperature drop had been anticipated by the temperature control apparatus. The same theory applies to the control of a cold producing means such as a refrigerating system, except that the temperature change and the heat momentum are in the opposite direction.

An object of this invention is to provide an apparatus and method for controlling temperature by anticipating both upward and downward temperature changes to prevent or reduce to a minimum the heat momentum in the temperature changing means.

Another object of this invention is to control the temperature of a space or mass by alternately increasing and decreasing the heat or cold producing activity of the temperature changing means in regulated periods.

A further object of this invention is to control temperatures as stated immediately above by interrupting the cycles of alternate operation upon predetermined changes in temperature to continue the heat or cold producing activity of the temperature changing means until a predetermined change in temperature takes place.

A still further object of the invention is to automatically control temperatures as set forth above but at the same time to permit manual temperature control.

Figure 5:
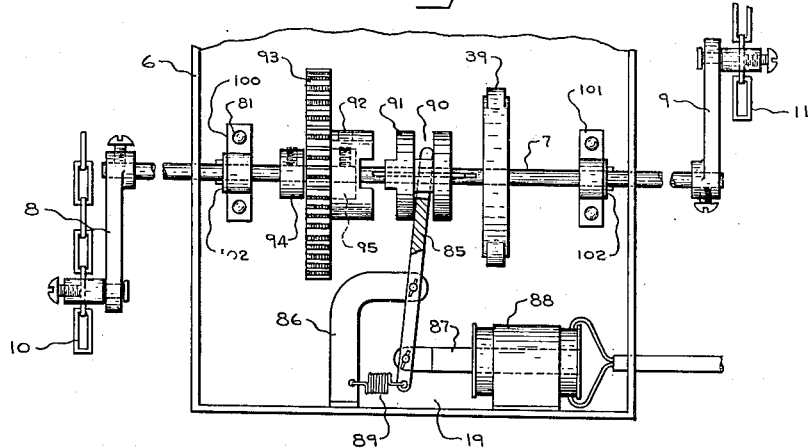
Figure 3:
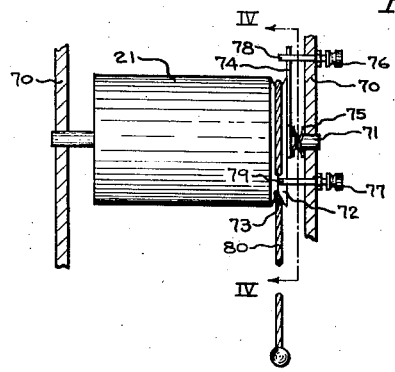
Figure 4:
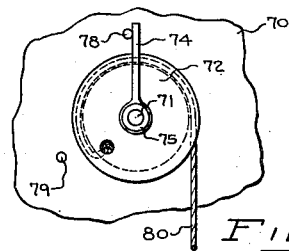

It is within the contemplation of this invention that the method of temperature control herein described be applicable to the control of any kind of heating or refrigerating equipment and that the apparatus for accomplishing the functions of this method may take one of an unlimited number of forms. It may serve to start and stop the combustion as in the case of a burner using liquid or gaseous fuel, or it may serve as in the case of a burner using solid fuel, to retard or accelerate the combustion by actuating the draft and check and/or the fuel feeding device. For purpose of illustration an apparatus which controls the draft and check of a conventional furnace burning solid fuel is described by the following specification and the above and other objects will be apparent when taken with the accompanying drawings in which, Fig. 1 is an elevation showing the temperature controlling apparatus installed on a furnace, Fig. 2 is a wiring diagram of the system, Fig. 3 is a side view of the contactor drum and manual switch, Fig. 4 is an end view of the contactor drum and manual switch, taken on the line IV—IV of Fig. 3, and Fig. 5 is a detailed showing of the magnetic clutch or voltage release.

Referring to Fig. 1 the furnace 1 is provided with the usual check 2 in the flue 3 and draft 4 in the ash pit door 5.

The temperature regulating apparatus is contained in a casing 6 which is located in any convenient position near the furnace 1. The driving shaft 7 extends from the casing 6 and carries on the ends thereof and extending in opposite directions, arms 8 and 9. The draft 4 is connected by the flexible chain 10 to the arm 8 and the flexible chain 11 connects the arm 9 to the check 2. The operation of the draft 4 and check 2 is that for one position of the shaft 7 with its arms 8 and 9, the draft 4 is open and the check 2 is closed and for the diametrically opposite position of the shaft 7 and its arms 8 and 9, the draft 4 is closed and the check 2 is open. The closing movement of both the draft 4 and the check 2 is effected by gravity due to their respective weights.

Figure 2:
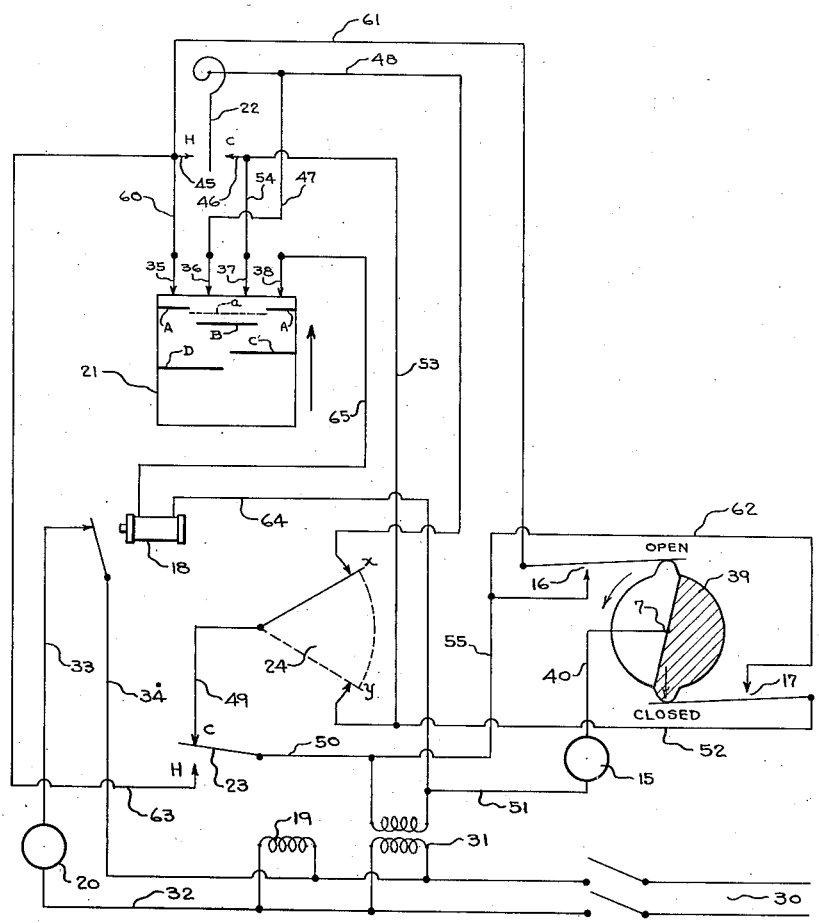

Fig. 2 discloses the wiring diagram of the apparatus. It includes an electric motor 15 for driving, through suitable reduction gearing the shaft 7, limit switches 16 and 17, a relay 18, an electromagnetic clutch or voltage release 19, a contactor drum motor 20, a rotatable contactor drum 21 driven by the motor 20, shown in development in Fig. 2 and in Fig. 3, a room thermostat 22, a furnace thermostat 23 and a manual switch 24.

The operation of the apparatus is briefly as follows: During normal operation with the temperature which is being regulated, held within a predetermined range, the draft is opened for a fixed period of time and closed for a fixed period of time by the operation of the contactor drum 21. If the furnace thermostat 23 moves to its hot position indicating too great a heat in the furnace the draft is closed until the furnace temperature lowers to a predetermined degree. The room thermostat 22 acts in conjunction with the contactor drum 21 to energize the relay 18 and thus open the contactor drum motor 20 circuit to stop the contactor drum 21 to hold the draft open or closed depending on whether the temperature regulated is above or below the predetermined range selected. The room thermostat 22 also acts independently of the contactor drum 21 to close or open the draft 4 when the temperature rises above or falls below the predetermined range selected. The manual switch 24 is for manually opening the draft 4 at any desired time as when firing the furnace. The draft is always opened or closed by the rotating of the shaft 7 by the motor 15. The effect of the foregoing automatic steps is to maintain the temperature regulated substantially midway between the range selected because the heat increasing or decreasing impulse, that is the opening or closing of the draft, is terminated before the desired midway temperature is reached, to permit the heat momentum to complete the necessary heat increasing or decreasing impulse.

More specifically the apparatus and operation are as follows: A source of power 30 such as a house lighting circuit is connected to a transformer 31 to step down the voltage for the operating circuits. Connected across the source 30 is a voltage release or electromagnetic clutch 19 shown in detail in Fig. 5 and more fully described hereinafter which is a safety feature for the purpose of closing the draft if the power supply fails. The contactor motor 20 for rotating the contactor drum 21 is also driven from the source 30 through conductors 32, 33 and 34.

The contactor drum 21 is of insulating material and has embedded in the periphery conducting strips A, B, C and D, the strip A being in two spaced parts connected by a concealed conductor a. The purpose of the conducting strips A, B, C and D is to electrically connect different pairs of the contact fingers 35, 36, 37 and 38, which are resiliently urged into sliding engagement with the drum 21, as the drum 21 rotates.

The shaft 7 to which the arms 8 and 9 are connected for operating the draft 4 and check 2, and which is driven by the motor 15 has mounted thereon a cam 39 for actuating the limit switches 16 and 17. The cam 39 is nonconducting but has over half of its periphery a conductor indicated in Fig. 2 by shading the conducting half. The conducting portion of the cam is also connected to the shaft 7 which in turn is connected by the conductor 40 to the motor 15. The limit switches 16 and 17 are normally closed but are urged into open position by the high points on the cam 39. The arrow on the cam 39 indicates when pointing to the legends "open" and "closed" the position of the draft. Thus as shown in Fig. 2, the draft is closed.

The room thermostat 22 is of the usual type and has adjustable spaced contacts 45 and 46 between which a bimetallic strip moves as the temperature regulated varies. The contact 46 is contacted by the bimetallic strip when the temperature regulated falls to a predetermined degree and the contact 45 is contacted when the temperature rises to a predetermined degree. The contacts 45 and 46 are spaced so that the bimetallic strip may move over a predetermined range of one or two degrees without contacting either.

In operation when the temperature regulated is within the predetermined range selected the contactor drum 21 rotates constantly and the cam 39 on the shaft 7 intermittently due to certain pairs of contact fingers bearing against the contactor drum 21 being connected by certain of the conductor strips in the surface of the contactor drum 21.

In Fig. 2 it will be observed that the cam 39 is in draft closed position and that the contactor drum 21 has moved the conducting strip D from the contact fingers and is about to move the contact strip A under the contact fingers. Nothing happens when the conducting strip A is under the contact fingers as that strip as well as contact strip C becomes operative only upon the engagement of the bimetallic strip of the room thermostat with one of the contacts 45 or 46.

When the conducting strip B moves under the contact fingers, the finger 36 known as the power finger and the contact finger 37 known as the draft open finger are connected, which connection completes the circuit having the conductors 47 and 48, the manual switch 24, the conductor 49, the furnace thermostat 23, the conductor 50, the secondary of the transformer 31, the conductor 51, the motor 15, the conductor 40, the cam 39, the limit switch 17, and the conductors 52, 53 and 54 to start the motor 15, the rotation of the shaft 7 and the opening of the draft 4. As soon as the cam starts to rotate the limit switches 16 and 17 close and the circuit through the motor 15 is completed then through the conductor 40, the cam 39, the limit switch 16, the conductor 55, the secondary of the transformer 31 and the conductor 51. When the draft has completely opened a high point on the cam 39 opens the limit switch 16 breaking the circuit through the motor 15 and stopping the movement of the shaft 7, leaving the draft 4 in open position. It will be observed that in the initial circuit closed through the motor 15 and including contact fingers 36 and 37 and the furnace thermostat 23, had the furnace been too hot the furnace thermostat 23 would have been in its hot position opening the circuit and preventing the opening of the draft.

As the rotation of the contactor drum 21 continues the draft remains open until the conducting strip D moves under the contact fingers 35 and 36. However, at this point the contact finger 35 known as the draft closed finger and the contact finger 36 or power finger are connected by the conducting strip D, completing a circuit to close the draft 4. This circuit comprises the conductors 60 and 61, the limit switch 16, the cam 39, the conductor 40, the motor 15, the conductor 51, the secondary of the transformer 31, the conductor 50, the furnace thermostat 23, the conductor 49, the manual switch 24, the conductor 48, and the conductor 47. As soon as the cam 39 starts to rotate the limit switches 16 and 17 closed and the circuit through the motor 15 is completed through the conductors 40 and 51, the secondary of the transformer 31, the conductors 55 and 62, the limit switch 17 and the cam 39.

It will be observed that if at the time the conducting strip D connected the contact fingers 35 and 36 the furnace had been too hot, the furnace thermostat 23 being in its hot position, the draft closing circuit including the contact fingers 35 and 36 would have not been closed and therefore as far as that circuit is concerned no closing of the draft would take place. However as soon as the furnace became too hot and the furnace thermostat 23 moved to its hot position, a draft closing circuit including the furnace thermostat 23, the conductors 63 and 61, the limit switch 16, the cam 39, the conductor 40, the motor 15, the conductor 51, the secondary of the transformer 31 and the conductor 50 would have been closed resulting in the operation of the motor 15 to rotate the shaft 7 to close the draft 4. Thus the draft 4 automatically closes when the furnace becomes too hot.

The circuit including the conductors 32, 33 and 34 for supplying power to the motor 20 which drives the contactor drum 21 includes a relay 18. When the relay is de-energized the motor 20 circuit is closed but when the relay 18 is energized the motor 20 circuit is opened. The purpose of the relay 18 is to open the motor 20 circuit at such times when the temperature regulated is above or below the predetermined range selected for the room thermostat 22, the connections being such that if the temperature regulated is above the predetermined range selected the relay 18 will be energized opening the motor 20 circuit to stop the contactor drum 21 in a position to maintain the draft 4 closed, and when the temperature regulated is below the predetermined range selected the motor 20 circuit is opened to stop the contactor drum 21 in a position to maintain the draft 4 open.

Assume, for instance, that when the contactor drum 21 has moved the conducting strip A under the contact fingers the contact fingers 35 and 36 will then be connected. With the temperature regulated within the predetermined range selected for the room thermostat 22 no action will take place. However, should the temperature regulated be above the predetermined range selected the bimetallic strip of the room thermostat 22 will be in its hot position, that is, in contact with the contactor 45. A circuit to energize the relay 18 and thereby open the motor 20 circuit to stop the contact drum 21 is thus completed through the conductor 60, the contact 45, the room thermostat 22, the conductor 48, the manual switch 24, the conductor 49, the furnace thermostat 23, the conductor 50, the secondary of the transformer 31 and the conductors 64 and 65. Therefore, since the draft is closed it will necessarily remain closed as far as automatic operation is concerned for the contactor drum 21 is stationary. As soon as the temperature regulated drops to within the predetermined range selected for the room thermostat 22 the relay 18 circuit is opened by the bimetallic strip of the room thermostat 22 moving from the contact 45, permitting the motor 20 circuit to close and the contactor drum 21 to start rotating. When the contactor drum rotates sufficiently to bring the conducting strip B under the contactor fingers the motor 15 circuit is completed as before described to result in the opening of the draft.

Assume that at the time the contactor drum 21 moves the conducting strip C under the contact fingers that the temperature regulated is below the predetermined range selected, the bimetallic strip of the room thermostat 22 will then be in contact with the contact 46 and a circuit completed between the conducting strip C, the contact finger 37, the conductor 54, the contact 46, the room thermostat 22, the conductor 48, the manual switch 24, the conductor 49, the furnace thermostat 23, the conductor 50, the secondary of the transformer 31, the conductor 64, the relay 18 and the conductor 65, and the contact finger 38. The relay 18 circuit will then be closed opening the motor 20 circuit to stop the rotation of the contactor drum 21. It will thus be obvious that as far as automatic operation is concerned the draft will be maintained open until the temperature regulated rises to within the predetermined range selected. The relay 18 circuit will then be opened closing the motor 20 circuit and starting the rotation of the contactor drum 21.

Another feature of the invention is that irrespective of the automatic opening and closing of the the draft effected by the contactor drum 21 and its conducting strips A, B, C, and D, if the temperature regulated rises or falls from the predetermined range selected circuits will be closed to close or open the draft, respectively. For instance, if the temperature falls below the predetermined range selected the bimetallic strip of the room thermostat 22 will move into engagement with the contact strip 46 to complete a circuit through conductors 53 and 52, the limit switch 17, the cam 39, the conductor 40, the motor 15, the conductor 51, the secondary of the transformer 31, the conductor 50, the furnace thermostat 23, the conductor 49, the manual switch 24, the conductor 48, and the room thermostat 22. Thus the motor 15 is energized to move the draft 4 to open position. If, however, the temperature regulated rises above the predetermined range selected and the draft 4 is open, a circuit will be closed including the conductor 61, the cam 39, the conductor 40, the motor 15, the conductor 51, the secondary of the transformer 31, the conductor 50, the furnace thermostat 23, the conductor 49, the manual switch 24, the conductor 48 and the room thermostat 22 to energize the motor 15 to close the draft. It will be clear that in the opening or closing of the draft in the manner just stated as soon as the high points of the cam 39 move from engagement with the limit switches 16 and 17 there will be a rearrangement of the motor 15 closing circuits including the limit switches 16 and 17, in the same manner as the rearrangement which followed the opening and closing of the draft following the closing of circuits by the conducting strips B and D of the contactor drum 21.

The manual switch 24 is provided for the opening of the draft at any time desired regardless of the operation of the automatic features of the invention. Such a time might be when it is desired to fire the furnace if the source of heat is a coal fire.

The manual switch 24 is arranged in frictional engagement with the contactor drum 21 so that when it is closed it is automatically returned to its initial position by the drum 21. Referring particularly to Figs. 3 and 4 the contactor drum 21 is disclosed mounted in a frame 70, the driving mechanism being omitted. Freely mounted on the shaft 71 of the drum 21 is a non-conducting sheave 72 having a peripheral groove 73 and fixedly secured to the sheave 72 is a switch arm 74. A spring 75 disposed on the shaft 71 between the frame 70 and the sheave 72 urges the sheave 72 into frictional engagement with one end of the drum 21. Mounted in the frame 70 are binding posts 76 and 77 respectively having pins 78 and 79 projecting into the path of the switch arm 74. A string 80 having one end anchored in the peripheral groove 73 of the sheave 72 depends from the groove 73. Rotation of the drum 21 in a counter-clockwise direction, as viewed in Fig. 4, results in the switch arm 74 being moved against the pin 78 which is the normal or $x$ position of the switch 24 as disclosed in Fig. 2. Upon pulling the string 80 the sheave 72 is rotated, resulting in the switch arm 74 being moved into engagement with the pin 79 placing the manual switch 24 in $y$ position as disclosed in Fig. 2. The engagement of the switch arm 74 with the pin 79, that is, moving the manual switch 24 from the $x$ to $y$ position closes the circuit including the conductor 49, the furnace thermostat 23, the conductor 50, the secondary of the transformer 31, conductor 51, the motor 15, the conductor 40, the cam 39, the limit switch 17 and the conductor 52, energizing the motor 15 which in turn causes the shaft 7 to rotate to open the draft 4. As soon as the cam 39 starts to rotate the motor 15 driving circuit changes to include the secondary of the transformer 31, the conductor 51, the motor 15, the conductor 40, the cam 39, the limit switch 16 and the conductor 55. Upon release of the string 80 the drum 21 being in frictional engagement with the sheave 72 drives the sheave 72 to automatically return the switch arm 74 into contact with the pin 78 which is the $x$ position of the manual switch 24 as disclosed in Fig. 2. The draft 4, however, remains open until the next automatic draft closing action takes place. This action could be the moving of the furnace thermostat 23 to its hot position, the movement of the room thermostat 22 to its hot position, or the movement of the conducting strip B of the contactor drum 21 under the contact fingers 36 and 37.

In order that the draft 4 and the check 2 may not be left in opened and closed positions, respectively, during the failure of the source 30, the shaft 7 is connected to the motor 15 through a magnetic clutch 19 as shown more particularly in Fig. 5. The magnetic clutch 19 comprises the yoke 85 pivoted at the middle thereof to a bracket 86 and to a plunger 87 of a solenoid 88. Opposing the action of the solenoid 88 tending to open the clutch is a spring 89 connected to one end of the yoke 85 and to the bracket 86. The yoke 85 engages with the central depressed portion 90 of a toothed driven clutch member 91. The clutch member 91 is slidably keyed to the shaft 7. Rotatably mounted on the shaft 7 is also the driving clutch member 92 preferably integrally formed with the gear wheel 93 forming a part of the driving connection between the motor 15 and the shaft 7. The clutch member 92 is maintained in fixed axial position on the shaft 7 by the collars 94 and 95. The shaft 7 is rotatably mounted in bearings 100 and 101 secured to the rear of the casing 6 and held against axial movement by pinned washers 102.

During operation of the apparatus the solenoid 88 is energized holding the plunger 87 to the right and moving the clutch members 91 and 92 into operative engagement. Failure of the power supply or source 30 will result in the de-energization of the solenoid 88 and consequent disengagement of the clutch members 91 and 92 due to the action of the spring 89, and upon disengagement of the clutch the draft 4 and the check 2 automatically close and open respectively by the action of the gravity due to the weighted bottom 103 of the draft 4.

The timing of the opening and closing of the draft 4 and check 2 is accomplished by adjusting the rotative speed of the contactor drum 21 and determining the position of the conductor strips A, B, C, and D in the contactor drum 21. It has been found for the most satisfactory operation of a domestic heating furnace under normal conditions the contactor drum 21 should make a single revolution each twenty minutes, and that the conductor strip B which closes the draft opening circuit and the conductor strip D which closes the draft closing circuit be spaced apart to provide an open draft for six minutes and a closed draft for fourteen minutes. With this relation the room temperature changes are successfully anticipated and the draft closes or opens in time to prevent excessive or insufficient heat. Were not the temperature changes anticipated by the regularly acting draft control and a response not received by the furnace until the room has reached the desired temperature heat momentum of the furnace would carry the room temperature past that desired. The conductor strips A and C should be disposed in the contactor drum 21 slightly in advance of the conductor strips B and D, respectively, so that in the event the temperature regulated is above the predetermined range selected just prior to the opening of the draft brought about by the closing of the draft opening circuit by the conductor strip B or below the predetermined range selected just prior to the closing of the draft by the conductor strip D closing the draft closing circuit, the rotation of the contactor drum 21 will stop, preventing closing or opening of the draft as the case may be until the temperature regulated has changed to within the predetermined range selected.

While the foregoing specification discloses a single embodiment of the invention it will be obvious that other circuits and apparatus may be devised to carry out its essential features. It is further within the contemplation of this invention that instead of regulating the draft 4 and the check 2 that it be employed to regulate the feeding of fuel or to control other conditions than heat where there is a delay and momentum between the cause and its effect.

Having thus described my invention what I desire to protect by Letters Patent and claim is:

1. In a thermostatically controlled system for the regulation of the temperature in a space heated by a furnace having a draft, a circuit operative to regularly open the draft for a predetermined period and to close the draft for a predetermined period, within a fixed temperature range, cyclically operating means in said circuit for controlling said circuit, a motor for driving the said means, a circuit for controlling said motor, and a circuit including a thermostat and second cyclically operating means to open said motor circuit to render said first cyclically operating means inoperative when the temperature controlled is out of said range to maintain the draft open or closed depending on its position when said first named means is rendered inoperative.

2. In a thermostatically controlled system for regulation of the temperature in a space heated by a furnace having a draft, a circuit operative to regularly open the draft for a predetermined period and to close the draft for a predetermined period, within a fixed temperature range, cyclically operating means in said circuit for controlling said circuit, a motor for driving the said means, a circuit for controlling said motor, a circuit including a thermostat, and a second cyclically operating means in said last named circuit to open said motor circuit to render said first cyclically operating means inoperative when the temperature controlled is out of said range, a second draft opening circuit, and a manually operable switch for closing said circuit.

3. A device for rotating a shaft in predetermined steps comprising a motor for driving the shaft, a cam mounted on the shaft, a limit switch associated with said cam, a starting circuit including a portion of said cam, a holding circuit including said portion of said cam and said limit switch, said limit switch being closed by movement of said cam from its initial position to close said holding circuit and opened by said cam at the end of a predetermined movement to open said holding circuit to deenergize said motor to stop the rotation of the shaft and the cam.

4. In a thermostatically controlled system for the regulation of the temperature in a space heated by a furnace having a draft, operating means for opening and closing the draft, a circuit operative to start the movement of said operating means to open said draft, a second circuit operative to start the movement of said operating means to close said draft, holding circuits to continue the operation of said operating means for a predetermined duration until the draft is entirely opened or closed as the case may be, cyclically operating means in said circuits for controlling the same to alternately operate said first named operating means to open and close said draft in cyclic operation when the temperature is within a predetermined temperature range, and means to render the cyclically operating means inoperative when the temperature controlled is out of said range to maintain the draft opened or closed depending on its position when said first named means is rendered inoperative.

5. In a thermostatically controlled system for the regulation of the temperature in a space heated by a furnace having a draft, a circuit operative to regularly open the draft for a predetermined period and to close the draft for a predetermined period, within a fixed temperature range, cyclically operating means in said circuit for controlling said circuit, and a circuit including a thermostat and second cyclically operating means to render said first cyclically operating means inoperative when the temperature controlled is out of said range to maintain the draft open or closed depending on its position when said first named means is rendered inoperative.

6. In a thermostatically controlled system for the regulation of the temperature in a space heated by a furnace having a draft, a circuit operative to regularly open the draft for a predetermined period and to close the draft for a predetermined period, within a fixed temperature range, two pairs of circuit closing contacts in said circuits, cyclically operating means for alternately electrically connecting said pairs of contacts for opening and closing the draft respectively, a motor for driving said means, a circuit for controlling said motor, and a circuit including a thermostat and second cyclically operating means to open said motor circuit to render said first cyclically operating means inoperative when the temperature controlled is out of said range to maintain the draft open or closed depending on its position when said first named means is rendered inoperative.

7. In a thermostatically controlled system for the regulation of the temperature in a space heated by a furnace having a draft, a circuit having two pairs of closing contacts operative to regularly open the draft for a predetermined period and to close the draft for a predetermined period respectively, within a fixed temperature range, moving means having an endless surface in turn having contact closing means for alternately closing said contacts for opening and closing the draft, a power source for driving said means, and a circuit including a thermostat and cyclically operating means to discontinue the driving of said first named means to render said moving means inoperative when the temperature controlled is out of said range to maintain the draft open or closed depending on its position when said first named means is rendered inoperative.

8. In a thermostatically controlled system for the regulation of temperature in a space heated by a furnace having a draft, circuits operative to regularly open the draft for a predetermined period and to close the draft for a predetermined period, within a fixed temperature range, said circuits including holding circuits, a cam for controlling said holding circuits, a motor for opening and closing said draft and for driving said cam included in said first named circuits, cyclically operating means in said first named circuits for controlling said first named circuits, said cyclically operating means controlling said cam operating motor, and a circuit including a thermostat, and second cyclically operating means to render said first named cyclically operating means inoperative when the temperature controlled is out of said range to maintain the draft open or closed depending on its position when said first named means is rendered inoperative.

9. In a thermostatically controlled system for the regulation of temperature in a space heated by a furnace having a draft, circuits operative to regularly open the draft for a predetermined period and to close the draft for a predetermined period, within a fixed temperature range, said circuits including holding circuits, a cam in and for controlling said holding circuits, said cam having an operative portion thereof of conducting material and being included in said first named circuits, a motor for driving said cam included in said first named circuits, cyclically operating means in said first named circuits for controlling said first named circuits, said cyclically operating means controlling said cam operating motor, and a circuit including a thermostat and second cyclically operating means to render said first named cyclically operating means inoperative when the temperature controlled is out of said range to maintain the draft open or closed depending on its position when said first named means is rendered inoperative.

10. In a thermostatic system for the regulation of a condition, condition correcting means, a circuit operative to regularly actuate said condition correcting means first in one direction and then in the other direction within a predetermined range of the condition corrected, cyclically operating means in said circuit for controlling said circuit, a motor for driving said means, a circuit for controlling said motor, and a circuit including a condition responsive device and second cyclically operating means to open said motor circuit to render said first cyclically operating means inoperative when the condition regulated is out of said range to maintain the condition correcting means effective continuously in one direction or the other depending on its state when said first named means is rendered inoperative.

11. In a thermostatic system for the regulation of a condition, condition correcting means, a circuit operative to regularly actuate said condition correcting means first in one direction and then in the other direction within a predetermined range of the condition corrected, cyclically operating means in said circuit for controlling said circuit, and a circuit including a condition responsive device and second cyclically operating means to render said first cyclically operating means inoperative when the condition regulated is out of said range to maintain the condition correcting means effective continuously in one direction or the other depending on its state when said first named means is rendered inoperative.

12. In a thermostatically controlled system for the regulation of temperature in a space heated by a furnace having a draft, circuits operative to regularly open the draft for a predetermined period and to close the draft for a predetermined period, within a fixed temperature range, said circuits including holding circuits, a cam for controlling said holding circuits, a motor for opening and closing said draft and for driving said cam included in said first named circuits, cyclically operating means controlling said cam operating motor, a motor for driving said means, a circuit for controlling said last named motor and a circuit including a thermostat and second cyclically operating means to open said motor circuit to render said first cyclically operating means inoperative when the temperature controlled is out of said range to maintain the draft open or closed depending on its position when said first named means is rendered inoperative.

13. In a thermostatically controlled system for the regulation of temperature in a space heated by a furnace, means for effecting a heat increase and a heat decrease, a shaft for operating said means, a circuit operative to control said shaft for periodic heat increasing and heat decreasing effects for predetermined periods respectively within a fixed temperature range, cyclically operating means in said circuit for controlling said circuit, and a circuit including a temperature responsive device and second cyclically operating means to render said first cyclically operating means inoperative when the temperature controlled is out of said range to maintain continuous the heat increasing effect or heat decreasing effect depending on the effect being given when said first named means is rendered inoperative.

14. In a thermostatically controlled system for the regulation of temperature in a space heated by a furnace, means for effecting a heat increase and a heat decrease, a shaft for operating said means, a circuit operative to regularly actuate said shaft for heat increasing and heat decreasing effects for predetermined periods respectively within a fixed temperature range, said circuit including a holding circuit, a cam fixed to said shaft for controlling said holding circuit, a motor for driving said shaft included in said first named circuit, cyclically operating means in said first named circuit for controlling said first named circuit, and a circuit including a temperature responsive device, and a second cyclically operating means to render said first cyclically operating means inoperative when the temperature controlled is out of said range to maintain continuous the heat increasing effect or heat decreasing effect depending on the effect being given when said first named means is rendered inoperative.

15. In an electrical system a circuit including operating means, means for closing said circuit for a relatively short period of time, and holding means to maintain said circuit closed after the opening of said closing means, said holding means comprising a holding circuit including a cam having a conducting portion and a switch, said cam being movable with said operating means, the conducting portion of said cam being included in said starting circuit and said closing circuit, movement of said cam opening the starting circuit, closing said switch, and moving said conducting portion into said holding circuit to close said holding circuit for a predetermined period of time.

MERVIN R. DOOLITTLE.